United States Patent
Alkove et al.

(10) Patent No.: US 7,437,771 B2
(45) Date of Patent: Oct. 14, 2008

(54) RENDERING PROTECTED DIGITAL CONTENT WITHIN A NETWORK OF COMPUTING DEVICES OR THE LIKE

(75) Inventors: James M. Alkove, Woodinville, WA (US); Clifford P. Van Dyke, Bellevue, WA (US); Eduardo Oliveira, Redmond, WA (US); Josh Benaloh, Redmond, WA (US); Troy Batterberry, Kirkland, WA (US)

(73) Assignee: Woodcock Washburn LLP, Redmond, WA (US)

( * ) Notice: Subject to any disclaimer, the term of this patent is extended or adjusted under 35 U.S.C. 154(b) by 677 days.

(21) Appl. No.: 10/827,167

(22) Filed: Apr. 19, 2004

(65) Prior Publication Data

US 2005/0235361 A1  Oct. 20, 2005

(51) Int. Cl.
  *H04L 9/14* (2006.01)
(52) U.S. Cl. .............................. 726/29; 726/26; 726/27
(58) Field of Classification Search ................... 726/26, 726/27, 29
  See application file for complete search history.

(56) References Cited

U.S. PATENT DOCUMENTS

| | | | | |
|---|---|---|---|---|
| 5,715,403 | A | 2/1998 | Stefik | 395/244 |
| 6,133,912 | A * | 10/2000 | Montero | 715/716 |
| 6,754,349 | B1 * | 6/2004 | Arthan | 380/286 |
| 2002/0152393 | A1 * | 10/2002 | Thoma et al. | 713/189 |
| 2002/0157002 | A1 * | 10/2002 | Messerges et al. | 713/155 |
| 2002/0198846 | A1 * | 12/2002 | Lao | 705/54 |
| 2004/0098583 | A1 * | 5/2004 | Weber | 713/168 |

FOREIGN PATENT DOCUMENTS

| | | |
|---|---|---|
| WO | WO 00/58811 | 10/2000 |
| WO | WO 00/59150 | 10/2000 |
| WO | WO 01/52021 A1 | 7/2001 |

OTHER PUBLICATIONS

Hong, S. et al., "On the construction of a powerful distributed authentication server without additional key management", *Computer Communications*, 2000, 23, 1638-1644.
Managing Digital Rights in Online Publishing, "How two publishing houses maintain control of copyright" *Information Management & Technology*, 2001, 34(4), 168-169.
Jakobsson, M. et al., "Proprietary Certificates", *Topics in Cryptology*, 2002, 164-181.
Kumik, P. "Digital Rights Management", *Computers and Law*, 2000, 11(4), 14-15.
Torrubia, A. et al., "Cryptography regulations for E-commerce and digital rights management", *Computers & Security*, 2001, 20(8), 724-738.

(Continued)

*Primary Examiner*—Hosuk Song
*Assistant Examiner*—Edward Zee
(74) *Attorney, Agent, or Firm*—Woodcock Washburn LLP

(57) ABSTRACT

Transmitter and receiver computing device are interconnected by a network. The transmitter transmits protected digital content to the receiver in a manner so that the receiver can access the content even though the content is directly licensed to the transmitter and not the receiver.

20 Claims, 6 Drawing Sheets

OTHER PUBLICATIONS

Zwollo, K. "Digital document delivery and digital rights management", *Information Services & Use*, 2001, 9-11.

Griswold, G.N. "A Method for Protecting Copyright on Networks", *IMA Intellectual Property Project Proceedings*, 1994, 1(1), 169-178.

Kahn, R.E. "Deposit, Registration and Recordation in an Electronic Copyright Management System", *IMA Intellectual Property Project Proceedings*, 1994, 1(1), 111-120.

Evans, P. "DRM: Is the Road to Adoption Fraught with Potholes?" *Seybold Reporting Analyzing Publishing Technologies*, 2001, 1(14), 32.

Fowler, T.B. "Technology's Changing Role in Intellectual Property Rights", *IT Professional(IEEE)*, 2002, 4(2), 39-44.

Gable, J. "The Digital Rights Conundrum", *Transform Magazine*, 2001, 10(11), 27.

Gunter, C.A., et al. "Models and Languages for Digital Rights", *Proceedings of the 34th Annual Hawaii International Conference on System Sciences*, 2001, 1-5.

Peinado, M. "Digital rights management in a multimedia environment", *SMPTE Journal*, 2002, 111(3), 159-163.

Royan, B. Content creation and rights management; experiences of SCRAN(the Scottish Cultural Resources Access Network), *Program*, 34(2), 131-142.

Valimaki, M. et al., "Digital rights management on open and semi-open networks", *WIAPP*, 2001, 154-155.

Yu, H. "Digital multimedia at home and content rights management", *IEEE, Proceedigns 2002 IEEE 4th International Workshop on Networked Appliances*, 2002, 49-56.

Hwang, C. et al., "Protection of Digital Contents on Distributed Multimedia Environment", *Proceedings of the IASTED International Conference, Internet and Multimedia Systems and Applications*, Nov. 19-23, 2000, Las Vegas, Nevada, USA, pp. 127-132.

Comino, N. et al., "A Novel Data Distribution Technique for Host-Client Type Parallell Applications", *IEEE Transactions on Parallel and Distributed Systems*, 2002, 13(2), 97-110.

\* cited by examiner

RENDERING PROTECTED DIGITAL CONTENT WITHIN A NETWORK OF COMPUTING DEVICES OR THE LIKE

TECHNICAL FIELD

The present invention relates to an architecture and method for allowing digital content with a corresponding digital license tied to a particular computing device within a network or the like to be rendered by another computing device within the network. More particularly, the present invention relates to such an architecture and method whereby the computing devices within the network negotiate access to the content as between the computing devices.

BACKGROUND OF THE INVENTION

As is known, and referring now to FIG. 1, a rights management (RM) and enforcement system is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer 14, a portable playback device or the like.

Typically, a content owner distributing such digital content 12 wishes to restrict what the user can do with such distributed digital content 12. For example, the content owner may wish to restrict the user from copying and re-distributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. An RM system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (i.e., (KD(CONTENT))), as well as other information identifying the content, how to acquire a license for such content, etc.

The trust-based RM system 10 allows an owner of digital content 12 to specify rules that must be satisfied before such digital content 12 is allowed to be rendered. Such rules can include the aforementioned requirements and/or others, and may be embodied within a digital license 16 that the user/user's computing device 14 (hereinafter, such terms are interchangeable unless circumstances require otherwise) must obtain from the content owner or an agent thereof, or such rules may already be attached to the content 12. Such license 16 may for example include the decryption key (KD) for decrypting the digital content 12, perhaps encrypted according to another key decryptable by the user's computing device or other playback device.

The content owner for a piece of digital content 12 would prefer not to distribute the content 12 to the user unless such owner can trust that the user will abide by the rules specified by such content owner in the license 16 or elsewhere. Preferably, then, the user's computing device 14 or other playback device is provided with a trusted component or mechanism 18 that will not render the digital content 12 except according to such rules.

The trusted component 18 typically has an evaluator 20 that reviews the rules, and determines based on the reviewed rules whether the requesting user has the right to render the requested digital content 12 in the manner sought, among other things. As should be understood, the evaluator 20 is trusted in the RM system 10 to carry out the wishes of the owner of the digital content 12 according to the rules, and the user should not be able to easily alter such trusted component 18 and/or the evaluator 20 for any purpose, nefarious or otherwise.

As should be understood, the rules for rendering the content 12 can specify whether the user has rights to so render based on any of several factors, including who the user is, where the user is located, what type of computing device 14 or other playback device the user is using, what rendering application is calling the RM system 10, the date, the time, etc. In addition, the rules may limit rendering to a pre-determined number of plays, or pre-determined play time, for example.

The rules may be specified according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the evaluator 20 determining that the user satisfies the rules, the digital content 12 can then be rendered. In particular, to render the content 12, the decryption key (KD) is obtained from a pre-defined source and is applied to (KD (CONTENT)) from the content package 13 to result in the actual content 12, and the actual content 12 is then in fact rendered.

In an RM system 10, content 12 is packaged for use by a user by encrypting such content 12 and associating a set of rules with the content 12, whereby the content 12 can be rendered only in accordance with the rules. Because the content 12 can only be rendered in accordance with the rules, then, the content 12 may be freely distributed. Typically, the content 12 is encrypted according to a symmetric key such as the aforementioned key (KD) to result in (KD(content)), and (KD(content)) therefore is also decrypted according to (KD) to result in the content 12. Such (KD) is in turn included within the license 16 corresponding to the content 12.

Oftentimes, such (KD) is encrypted according to a public key such as the public key of the computing device 14 (PU-C) upon which the content 12 is to be rendered, resulting in (PU-C(KD)). Note, though, that other public keys may be employed, such as for example a public key of a user, a public key of a group of which the user is a member, etc. Thus, and presuming the public key is (PU-C), the license 16 with (PU-C(KD)) is tied to and may only be used in connection with such computing device 14 inasmuch as only such computing device 14 should have access to the private key (PR-C) corresponding to (PU-C). As should be appreciated, such (PR-C) is necessary to decrypt (PU-C(KD)) to obtain (KD), and should be closely held by such computing device 14.

It is to be appreciated that a user at times may have a plurality of computing devices 14 that are networked or otherwise inter-connected in a network 17 or the like. In such a situation, it may be the case that the user may obtain a license 16 to render a corresponding piece of content 12, where the license 16 includes (KD) for the piece of content 12 encrypted according to the public key of a first computing device 14 (PU-C1) to result in (PU-C1(KD)), and thus such license 16 is tied to such first computing device 14. Moreover, in such a situation, it may further be the case that the user wishes to render the content 12 on a second computing device 14 that is in the network 17 with the first computing device 14. However, and crucially, such second computing device 14 does not have access to the private key of the first computing device 14 (PR-C1), as such first computing device 14 should be loathe to reveal such (PR-C1) to such second computing device 14. Instead, such second computing device 14 only has access to the private key of such second computing device 14 (PR-C2), which of course cannot be applied to (PU-C1(KD)) to reveal such (KD).

Thus, without additional architecture, the second computing device 14 is unable to obtain (KD) from (PU-C1(KD)) and thereby decrypt (KD(content)), as is necessary to render such content 12. Such inability exists even though the user can render the content 12 by way of the first computing device 14, the second computing device 14 is in the network 17 with the first computing device 14, and both the first and second computing devices 14 are under the control of the same user.

Accordingly, a need exists for an architecture and method that allow content 12 with a corresponding license 16 tied to one computing device 14 in a network 17 or the like to be rendered by any other appropriate computing device 14 in the network 17, presuming the license 16 so allows. In particular, a need exists for a method of negotiating access to the content 12 as between the computing devices 14 in the network 17.

SUMMARY OF THE INVENTION

The aforementioned needs are satisfied at least in part by the present invention in which a method is provided in connection with a first computing device ('transmitter') and a second computing device ('receiver') interconnected by a network, where the transmitter transmits protected digital content to the receiver in a manner so that the receiver can access the content. The content is encrypted and decryptable according to a content key (KD).

In the method, the receiver sends a session request to the transmitter, where the session request includes an identification of the content to the transmitter, an action to be taken with the content, and a unique identification of the receiver. The transmitter receives the session request from the receiver, determines from the unique identification of the receiver in the session request that the receiver is in fact registered to the transmitter, obtains a digital license corresponding to the identified content in the session request, reviews policy set forth in the license to determine that the license allows the transmitter to provide access to the content to the receiver and also allows the action in the session request, and sends a session response to the receiver, where the session response includes the policy from the license, the unique identification of the receiver, and the content key (KD) for decrypting the encrypted content, (KD) being protected in a form obtainable by the receiver.

The transmitter obtains the content encrypted according to (KD) to result in (KD(content)), and sends (KD(content)) to the receiver. The receiver receives the session response and (KD(content)), retrieves the policy and the protected content key (KD) for decrypting the encrypted content from the session response, confirms that the policy allows the receiver to render the content, obtains the content key (KD), applies (KD) to (KD(content)) to reveal the content, and then in fact renders the content in accordance with the policy.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
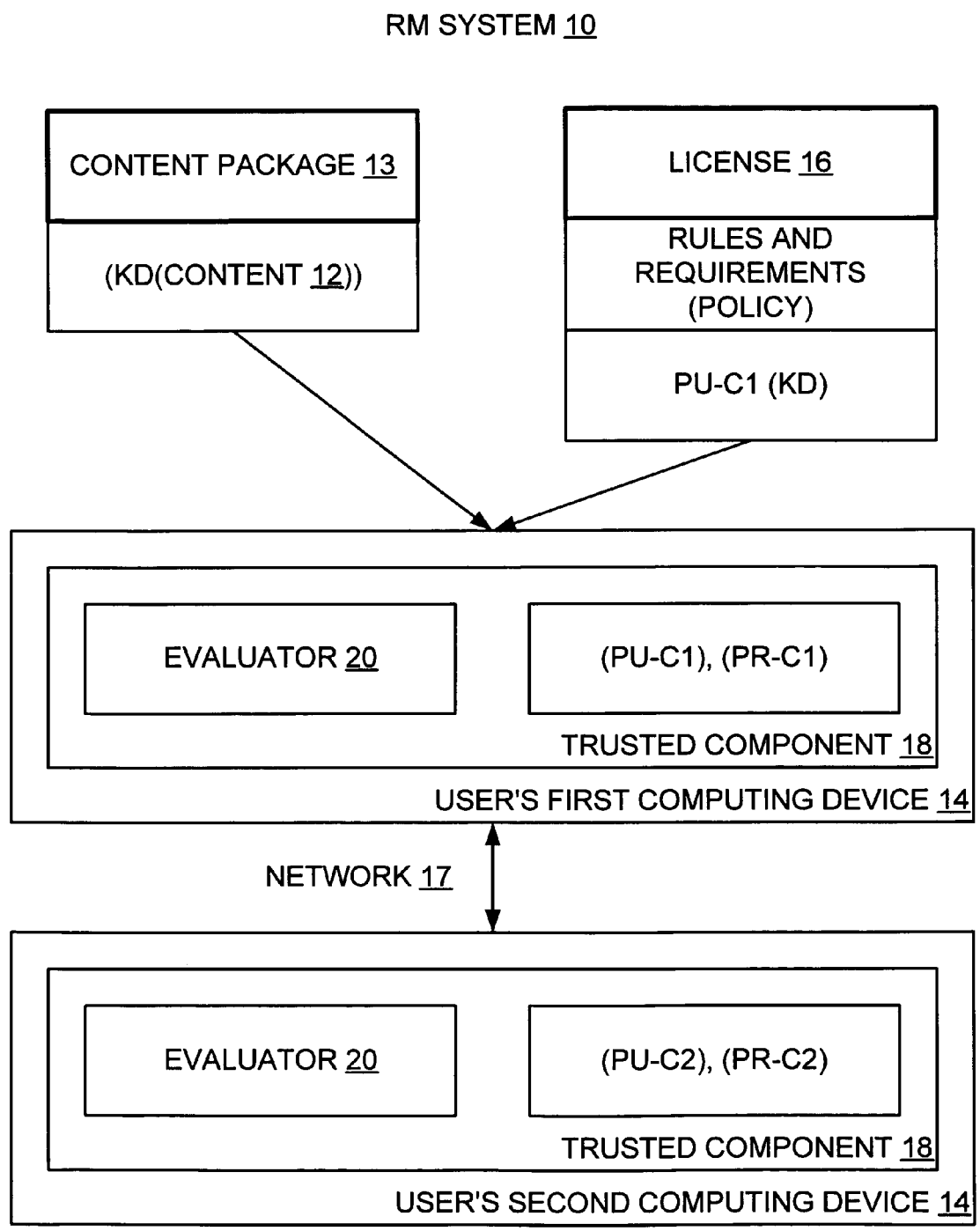
FIG. 1 is a block diagram showing an enforcement architecture of an example of a trust-based system.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures, and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 2:
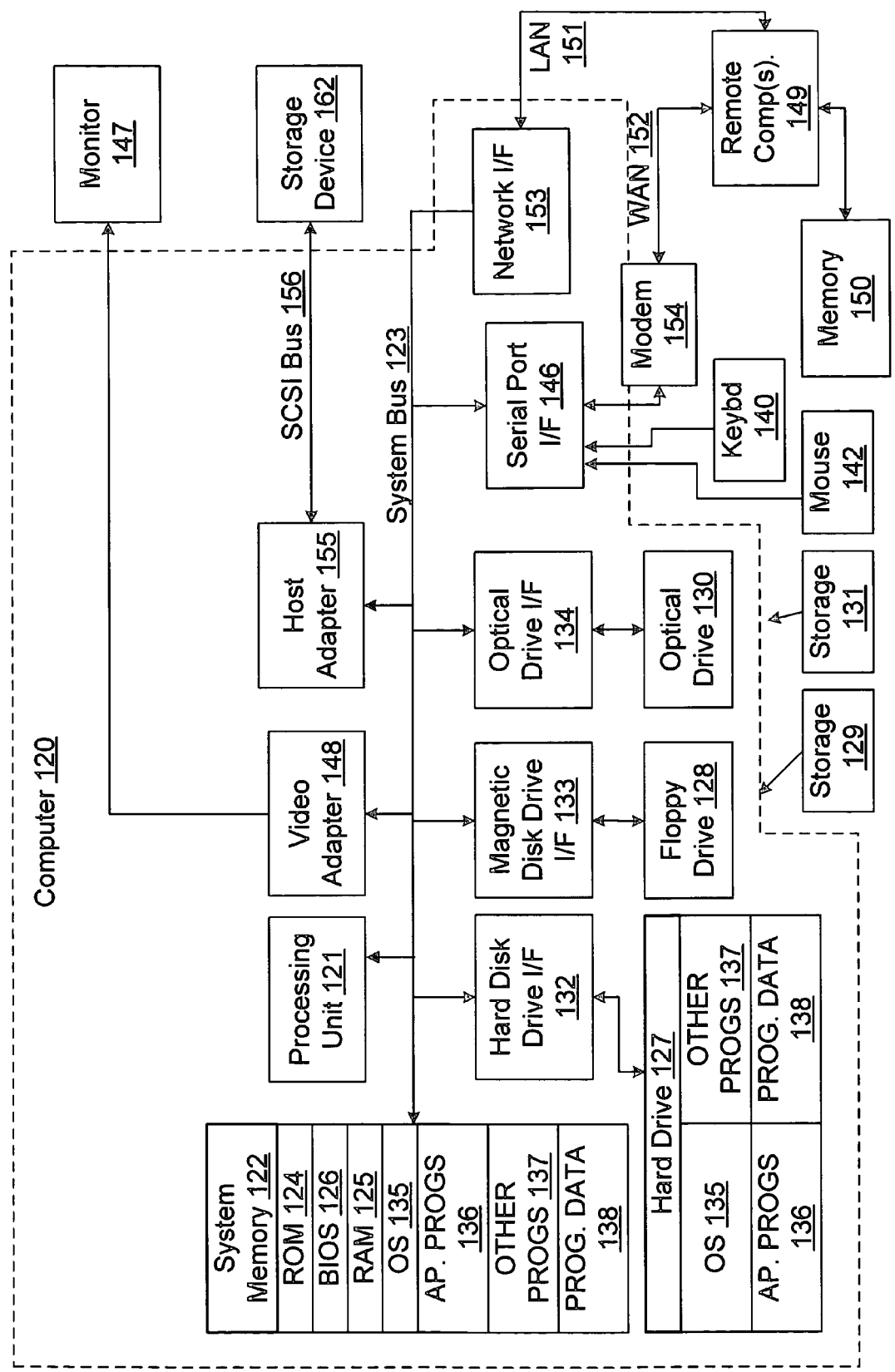
FIG. 2 is a block diagram representing a general purpose computer system in which aspects of the present invention and/or portions thereof may be incorporated.

As shown in FIG. 2, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk, a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk 127, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 2 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device, or other common network node, and typically includes many or all of the elements described above relative to the personal computer 120, although only a memory storage device 150 has been illustrated in FIG. 2. The logical connections depicted in FIG. 2 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Rendering Content 12 in Networked Computing Devices 14

Content protection denotes a spectrum of methods and technologies for protecting digital content 12 such that such content 12 cannot be used in a manner inconsistent with the wishes of the content owner and/or provider. Methods include copy protection (CP), link protection (LP), conditional access (CA), rights management (RM), and digital rights management (DRM), among other. The Base of any content protection system is that only a trusted application that ensures proper adherence to the implicit and/or explicit rules for use of protected content 12 can access same in an unprotected form. Typically, content 12 is protected by being encrypted in some way, where only trusted parties are able to decrypt same.

Copy protection, in the strictest sense, specifically applies to content 12 residing in a storage device, whereas link protection applies to content 12 flowing between applications/devices over a transmission medium. Conditional access can be thought of as a more sophisticated form of link protection, where premium programs, channels and/or movies are encrypted in transit. Only subscribers who have paid for access to such content 12 are provided with the keys necessary to decrypt same.

Digital Rights Management is an extensible architecture where the rules regarding sanctioned use of a particular piece of content 12 are explicit and bound to or associated with the content 12 itself. DRM mechanisms can support richer and more expressive rules than other methods while providing greater control and flexibility at the level of individual pieces of content or even sub-components of that content. An example of a Digital Rights Management system is set forth in U.S. patent application Ser. No. 09/290,363, filed Apr. 12, 1999 and U.S. Provisional Application No. 60/126,614, filed Mar. 27, 1999 each of which is hereby incorporated by reference in its entirety.

Rights Management is a form of DRM that is organizationally based in that content 12 can be protected to be accessible only within an organization or a subset thereof. An example of a Rights Management system is set forth in U.S. patent applications Ser. Nos. 10/185,527, 10/185,278, and 10/185,511, each filed on Jun. 28, 2002 and hereby incorporated by reference in its entirety.

In the present invention, content 12 with a corresponding license 16 tied to a first computing device 14 in a network 17 may be accessed by way of second computing device 14 in the network 17, provided of course that the license 16 so allows. Typically, the network 17 is a home or business network 17 that is restricted to a relatively modest number of users, although it is to be appreciated that the network 17 may be any appropriate network of interconnected computing devices 14 without departing from the spirit and scope of the present invention. For example, the network 17 may be as simple as a cable interconnecting the computing devices 14. Note, though, that an owner of content 12 may wish to restrict access of such content 12 over a relatively large network 17 such as for example the Internet, and may even wish to restrict access of such content 12 over any network 17 whatsoever, such as for example when such access may subvert the owner receiving a license fee for a license 16 for the content 12, or if such access could increase the likelihood that the content 12 would be stolen by a nefarious entity.

The computing devices 14 in the network 17 may be any appropriate computing devices 14 without departing from the spirit and scope of the present invention. Typically, at least some computing devices 14 in the network are personal computing devices such as laptop or desktop computers, and it is to be recognized that at least some of such computing devices 14 may also be portable computing devices that are connected to the network 17 only to download content for rendering thereon, rendering computing devices 14 such as printers, monitors, speakers, etc., portable memory devices, and the like. The present invention may be employed, then, to extend the reach of RM-protected content 12 to a portable electronic player device 14 connected to a computer 14 over a home network 17. Significantly, the present invention enables access to protected content 12 while enforcing the rights specified by the content owner in a license 16 corresponding thereto.

With the present invention, then, a digital media store may centrally store a library of content on a personal computer 14 while still allowing remote access from points throughout a limited area such as a home, even if the device 14 remotely accessing the content 12 does not acquire a license 16 tied thereto for the content 12. With the present invention, content 12 is safely transmitted over a network 17 while preserving the rights of the owner of such content 12.

In one embodiment of the present invention, the method of delivering the content 12 from a first, transmitting computing device 14 (hereinafter, 'transmitter') to a second, receiving computing device 14 (hereinafter, 'receiver') is agnostic to the actual protocols used for transporting the content 12. Thus, the particular way in which the transmitter and receiver communicate is irrelevant to the method. In addition, in one embodiment of the present invention, the method of delivering the content 12 from the transmitter to the receiver is agnostic to the format of the content 12. Thus, the any particular type of content 12 may be sent to from the transmitter to the receiver by way of such method.

Figure 3:
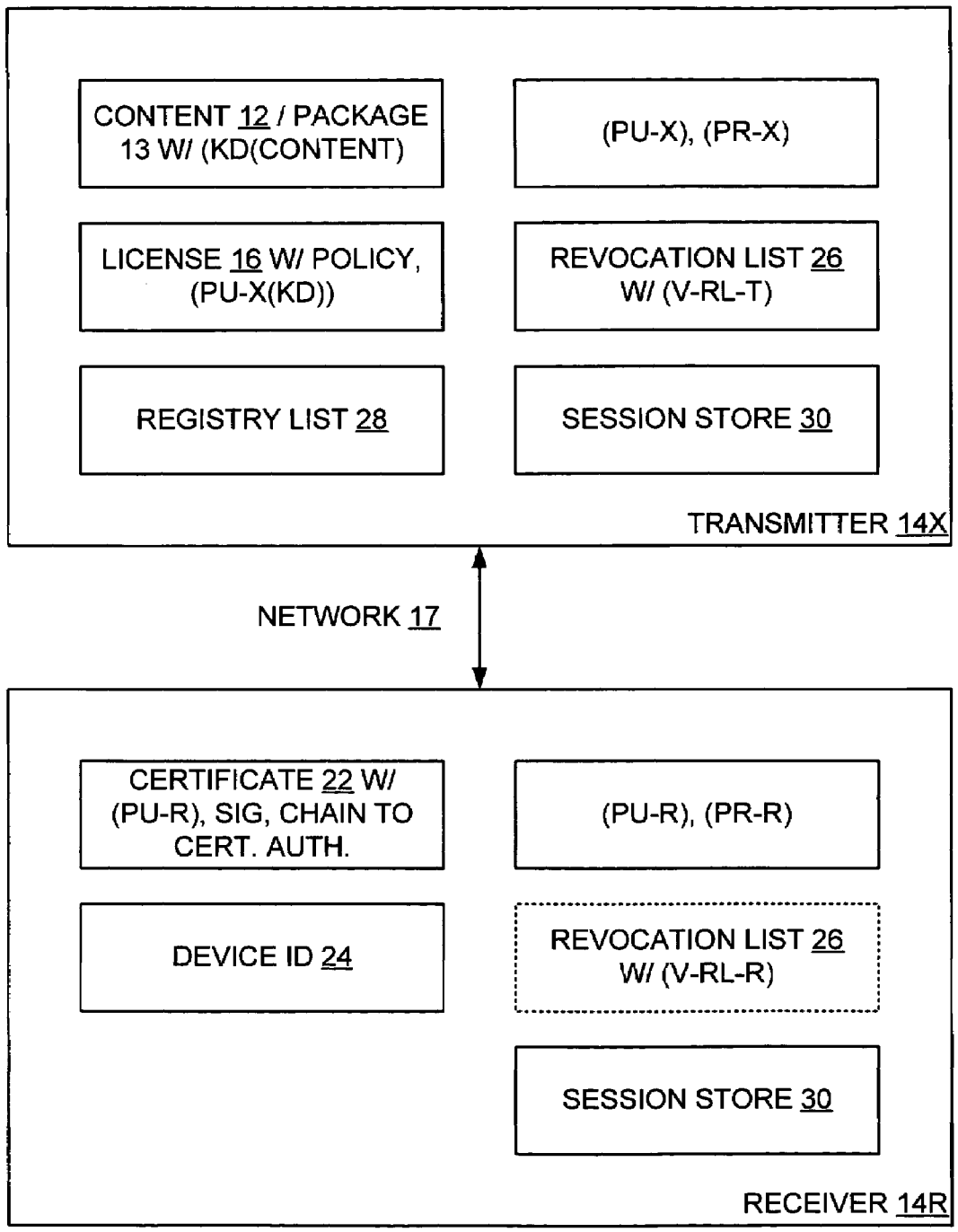
FIG. 3 is a block diagram showing the transmitter and receiver of FIG. 1.

Turning now to FIG. 3, it is seen that in one embodiment of the present invention, a transmitter 14x transmits content 12 to a receiver 14r over an interconnecting network 17, where the transmitter already has such content 12 and a license 16 corresponding thereto, and where the transmitter 14x has a public-private key pair (PU-X, PR-X) associated therewith and the receiver 14r likewise has a public-private key pair (PU-R, PR-R) associated therewith. As shown, the content 12 is in the form of a content package 13 with the content 12 encrypted according to a symmetric content key (KD) to result in (KD(content)), and the license 16 includes a description of rights and conditions (hereinafter, 'policy'), perhaps including whether the receiver 14r may access the content 12 by way of the transmitter 14x and the network 17, and also includes the content key (KD) encrypted according to the private key of the transmitter 14x (PU-X) to result in (PU-X (KD)). Note that although the present invention is disclosed primarily in terms of a symmetric content key (KD) and public-private key pairs for the transmitter 14x and the receiver 14r, other encryption arrangements may also be employed without departing from the spirit and scope of such present invention.

Figure 4:
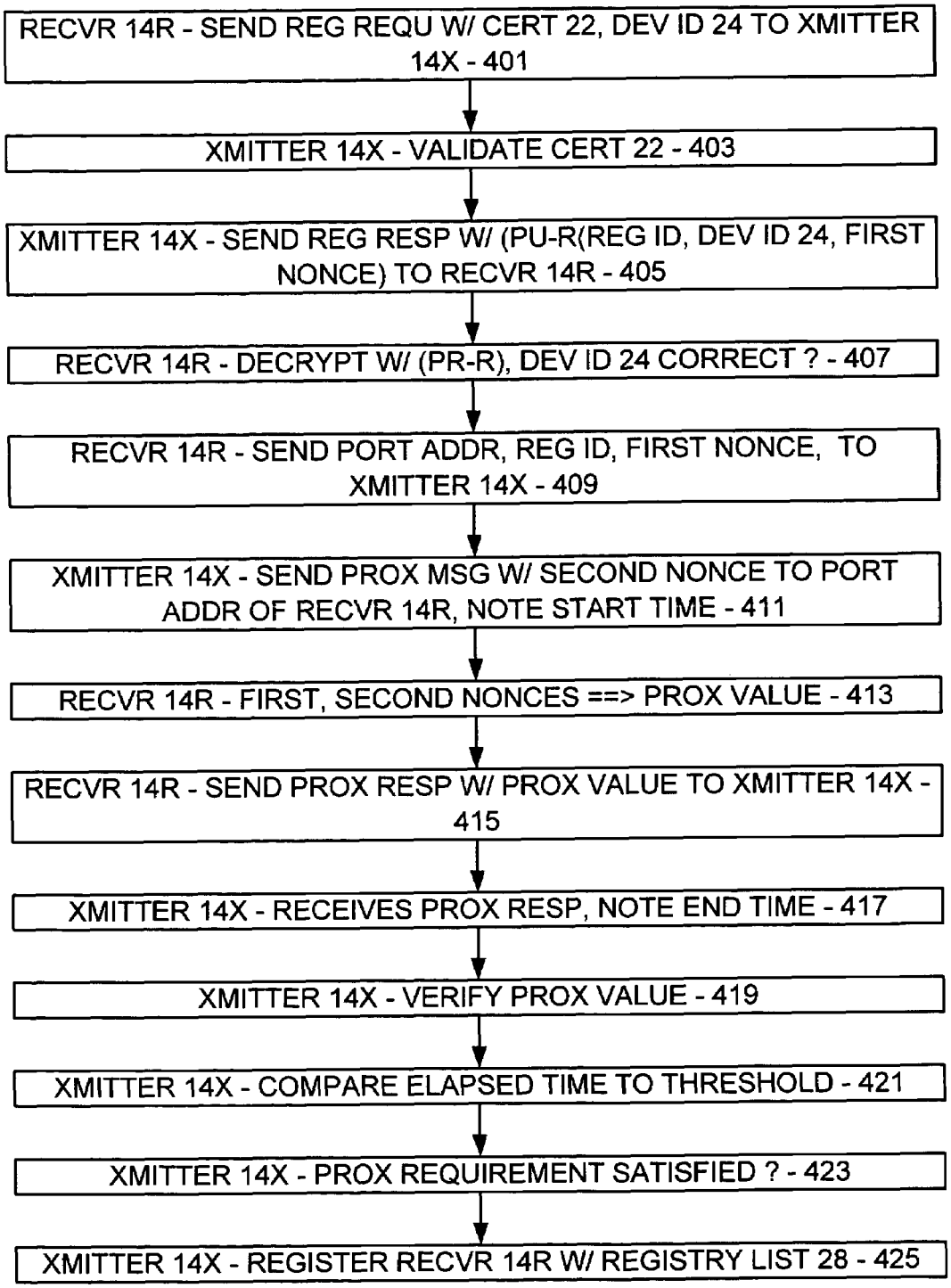
FIGS. 4, 5, and 6 are flow diagrams showing key steps performed by the transmitter and receiver of FIG. 3 when registering the receiver to the transmitter (FIG. 4), establishing a session between the receiver and transmitter (FIG. 5), and transferring content from the transmitter to the receiver (FIG. 6) in accordance with one embodiment of the present invention.
Figure 5:
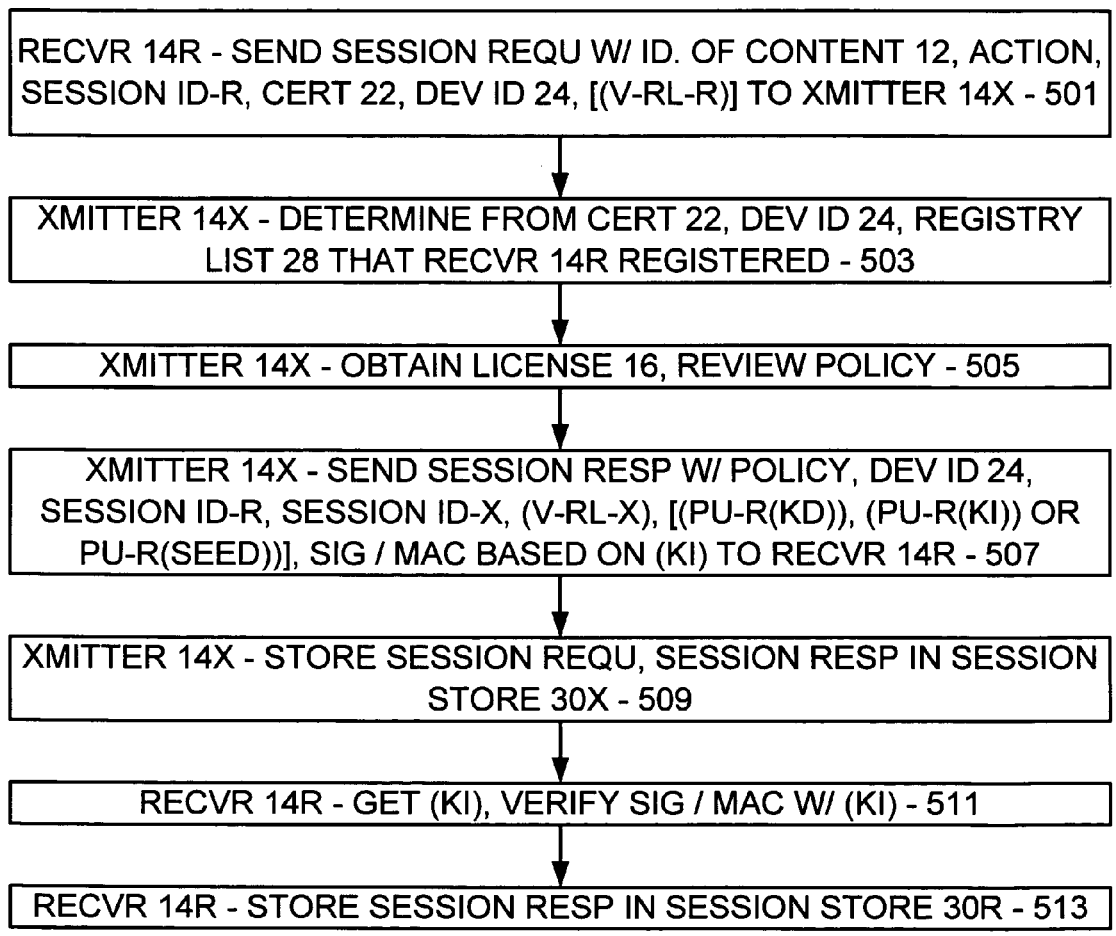
Figure 6:
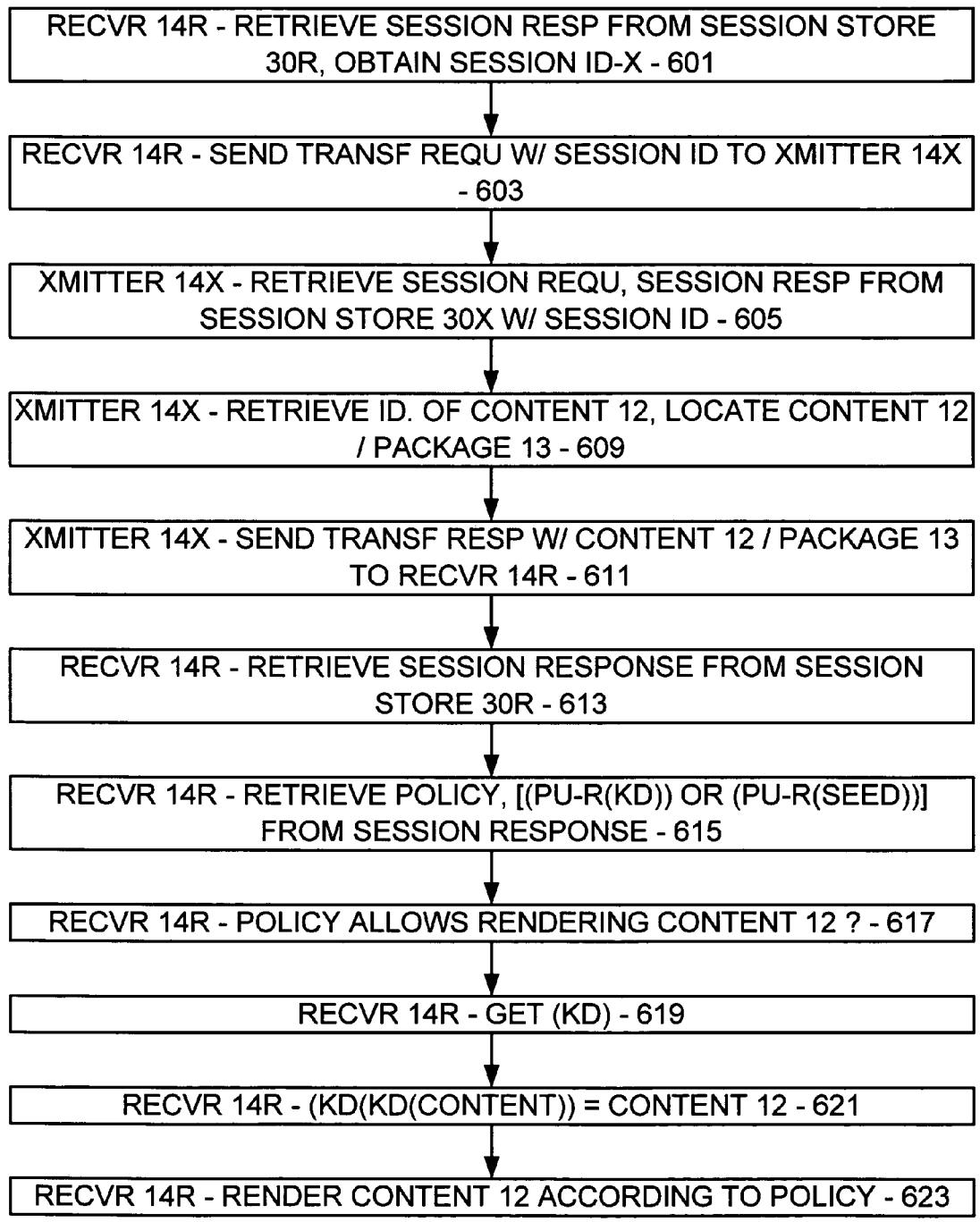

Turning now to FIGS. 4-6, to arrange for the receiver 14r to access the content 12 by way of the transmitter 14x and network 17, and in one embodiment of the present invention, methods are employed to register the receiver 14r to the transmitter 14x (FIG. 4), establish a session between the transmitter 14x and receiver 14r (FIG. 5), and transfer the content 12 from the transmitter 14x to the receiver 14r (FIG. 6), whereby the receiver 14r can render the transferred content 12 according to the terms of the license 16 corresponding thereto.

In particular, and referring now to FIG. 4, in one embodiment of the present invention, the receiver 14r is registered to the transmitter 14x upon the receiver 14r sending a registration request to the transmitter 14x by way of the interconnecting network 17 (step 401). As should be appreciated, the registration request should include a unique identification of the receiver 14r, and accordingly such unique identification is at least partially achieved by including with the registration request a digital certificate 22 provided to the receiver 14r by an appropriate certifying authority. As may also be appreciated, the digital certificate 22 includes therein the public key of the receiver 14r (PU-R) and is digitally signed by the certifying authority, and thus the digital signature of the certificate 22 may be verified by appropriate application of (PU-R) thereto. As may further be appreciated, the certificate 22 may include a chain of certificates leading back to the certifying authority, whereby the transmitter 14x with knowledge of a verifying public key corresponding to the certifying authority may verify the chain of certificates to ascertain that the certificate 22 did indeed originate from the certifying authority.

In at least some instances, and as is known, a receiver 14r may share a certificate 22 with other similar devices, especially if the receiver 14r is relatively simple or was otherwise designed as such by the manufacturer thereof. In anticipation of such a situation, and to ensure that the registration request does indeed include a unique identification of the receiver 14r, the registration request from the receiver 14r also includes a device ID 24 of such receiver 14r, whereby the device ID 24 of such receiver 14r is different from the device ID 24 of every other similar device that could share a common certificate 22 with such receiver 14r. Thus, between the certificate 22 and the device ID 24, the receiver 14r is uniquely identified in the registration request sent to the transmitter 14x. Note that while the device ID 24 may be dispensed with in the case where a certificate 22 is unique to a receiver 14r, the transmitter 14x and/or the receiver 14r may not always be capable of ascertaining whether such certificate 22 is indeed unique to the receiver 14r, and thus it may be considered good practice to always require a device ID 24 with a certificate 22 in a registration request.

At any rate, upon receiving the registration request, the transmitter 14x validates the certificate 22 thereof (step 403), and in particular verifies that the certificate 22 can be traced back by way of the accompanying chain of certificates to a certifying authority known to and approved by such transmitter 14x, and also verifies with reference to an appropriate revocation list 26 thereof that the certificate 22 has not been revoked. Essentially, then, the transmitter 14x will impart trust to the receiver 14r to properly handle received content 12, at least in part, if the receiver 14r owns a non-revoked certificate 22 derived from an approved certifying authority.

Presuming the transmitter 14x finds a non-revoked and approved certificate 22 in the registration request, the transmitter 14x may decide without further ado to in fact register the receiver 14r as being able to access content 12 by way of such transmitter 14x and the network 17. However, in one embodiment of the present invention, the transmitter 14x prior to registering the receiver 14r also ensures that the receiver 14r is within a certain proximity to the transmitter 14x, measured either as a function of distance, time, or otherwise. As may be appreciated, such a proximity requirement may be employed to prevent a situation where a wide-area network 17 is employed to register a receiver 14r to a transmitter 14x. Such use of a wide-areas network 17 is to be discouraged inasmuch as any receiver 14r anywhere in the world should not be allowed to register with the transmitter 14x. Otherwise, one or more users could create a broad network 17 of receivers 14r registered to the transmitter 14x and thereby subvert an implicit goal of restricting access to content 12 by way of the network 17 to one user or possibly a well-defined group of related users.

At any rate, to enforce such a proximity requirement, and still referring to FIG. 4, the transmitter 14x sends a registration response to the requesting receiver 14r by way of the interconnecting network 17 (step 405). In one embodiment of the present invention, the registration response includes a registration ID generated by the transmitter 14x to identify the registration request, at least one of the device ID 24 and (PU-R) of the receiver 14r as obtained from the registration request, and a first nonce to be employed as will be set forth in more detail below. As should be appreciated, the first nonce is essentially a random value. To prevent any nefarious entity from browsing such information, the registration response or at least a portion thereof may be encrypted in a manner decryptable by the receiver 14r, such as for example by (PU-R) thereof, although another cryptographic key may be employed without departing from the spirit and scope of the present invention.

Upon receiving the registration response, the receiver 14r decrypts same and ensures that the at least one of the device ID 24 and (PU-R) are that of such receiver 14r (step 407), and if so the receiver 14r sends an address of a port thereof along with the registration ID to the transmitter 14x by way of the interconnecting network 17 (step 409). As will be seen below, the port may be any appropriate port of the receiver 14r, and should be selected primarily based on how quickly the transmitter 14x can access the receiver 14r thereby for the reason that the proximity requirement is satisfied primarily based on how quickly the transmitter 14x sends a proximity message to the receiver 14r and receives a proximity response therefrom.

With the port address as received from the receiver 14r, the transmitter 14x performs a proximity test by sending the proximity message with a second nonce to the receiver 14r by way of the network 17 and the received port address of such receiver 14r (step 411). The second nonce is to be employed as will be set forth in more detail below. The second nonce is essentially a random value. Concurrently with step 411, the transmitter 14x notes a start time at which the proximity message with the second nonce is sent.

The receiver 14r receives the proximity message with the second nonce from the transmitter 14x by way of the network 17 and the port address of such receiver 14r, and thereafter employs the received first and second nonces to produce a proximity value (step 413), and then sends the proximity response with the proximity value back to the transmitter 14x by way of the network 17 (step 415). Note that the proximity value may be any value based on the first and second nonces without departing from the spirit and scope of the present invention. For example, the proximity value may be a hash of the first and second nonces. Likewise, the proximity value may be achieved by employing the first nonce as a cryptographic key to perform a hash over the second nonce. Note here that the performed hashes may be any appropriate performed hashes without departing from the spirit and scope of the present invention. Performing a hash is known or should be apparent to the relevant public and therefore need not be set forth herein in any detail.

At any rate, the transmitter 14x receives the proximity response with the proximity value from the receiver 14r by way of the network 17 (step 417), and concurrently therewith notes an end time at which the proximity value is received, thus ending the proximity test. Thereafter, the transmitter 14x verifies the proximity value based on knowledge of the first and second nonces (step 419). Presuming the proximity value verifies, the transmitter 14x then calculates from the noted start and end times an elapsed time and compares same to a predetermined threshold value (step 421), and decides from the comparison whether the receiver 14r is close enough to satisfy the proximity requirement (step 423). If so, the transmitter 14x registers the receiver 14r as being able to access content 12 from such transmitter 14x by way of the interconnecting network 17 (step 425). As may be appreciated, the elapsed time should at least roughly correspond to how far away the receiver 14r is from the transmitter 14x, and thus the elapsed time from the proximity test should be less than the threshold value to satisfy the proximity requirement. Such a threshold value may be determined for the transmitter 14x on a case-by-case basis, may be set to a particular value by some external source, may be set to a particular value by a requirement of a license 16, or the like.

To evidence that the receiver 14r is in fact registered to the transmitter 14x, the transmitter 14x may maintain a registry list 28 including an identification of the receiver 14r such as the certificate 22 with (PU-R) therein and/or the device ID 24 from the receiver 14r. Of course, such registry list 28 may also have other appropriate information therein without departing from the spirit and scope of the present invention.

Once registered to the transmitter 14x, the receiver 14r may remain registered indefinitely. Alternatively, the transmitter 14x may periodically require the receiver 14r to re-register in accordance with the method shown in FIG. 4. Such re-registration may for example be required after a certain time period, after a certain number of pieces of content 12 are accessed, after the trusted component 18 of the receiver 14r is upgraded, or the like. Such information may of course be recorded in an appropriate manner within the registry list 28. Among other things, periodically re-registering the receiver 14r ensures that the receiver 14r still satisfies the proximity requirement.

The transmitter 14x can theoretically register any number of receivers 14r thereto. However, in one embodiment of the present invention, the transmitter 14x has a predefined maximum number of receivers 14r that can be registered thereto. Likewise, in one embodiment of the present invention, the transmitter 14x has a predefined number of receivers 14r that can concurrently access content 12 therefrom. Again, such information may of course be recorded in an appropriate manner within the registry list 28. Thus, a user cannot subvert an implicit goal of restricting access to content 12 to a limited number of receivers 14r by way of the network 17. As should be appreciated, once the maximum number of receivers 14r is reached, the transmitter 14x in the former case can no longer register new receivers 14r thereto unless an existing registered receiver 14r is appropriately de-registered, and in the latter case can no longer allow access to content 12 to a new receiver 14r unless an existing accessing receiver 14r is appropriately de-coupled.

Presuming now that the receiver 14r is registered to the transmitter 14x, and as was alluded to above, the receiver 14r in one embodiment of the present invention must establish a session with the transmitter 14x to access content 12 therefrom. Referring now to FIG. 5, in one embodiment of the present invention, the transmitter 14x and receiver 14r establish a session therebetween upon the receiver 14r sending a session request to the transmitter 14x by way of the network 17 (step 501). In particular, the session request identifies the content 12 to the transmitter 14x and an action to be taken therewith, and also includes a session ID-R generated by the receiver 14r to identify the session request, the certificate 22 of the receiver 14r with (PU-R) therein, and the device ID 24 thereof.

In addition, it may be the case that the session request includes a version number of a revocation list 26 of the receiver 14r (V-RL-R). As may be appreciated, inasmuch as the transmitter 14x has such a revocation list 26 for verifying that a certificate 22 from a receiver 22 is not revoked as at step 403 of FIG. 4, the receiver 14r may also have such a revocation list 26 in the case where the receiver 14r itself acts as a transmitter 14x with respect to another receiver 14r. Thus, the receiver 14r when functioning as a transmitter 14x may itself have need for and refer to such a revocation list 26. As may also be appreciated, and as set forth in more detail below, the version number of the revocation list 26 of the receiver 14r (V-RL-R) is compared to the version number of the revocation list 26 of the transmitter 14x (V-RL-X), and if (V-RL-X) is more current than (V-RL-R) and is properly signed by the issuing certification authority, the transmitter 14x may send the revocation list 26 thereof to the receiver 14r. Optionally, if (V-RL-R) is more current than (V-RL-X), the receiver 14r may send the revocation list 26 thereof to the transmitter 14x. Thus, the revocation lists 26 on each of the transmitter 14x and the receiver 14r may be updated as necessary.

In response to the session request from the receiver 14r, the transmitter 14x first determines based on the certificate 22 with (PU-R) therein and/or the device ID 24 from the session request and with reference to the registry list 28 thereof that the receiver 14r is in fact registered to the transmitter 14x (step 503). Thereafter, the transmitter 14x obtains the license 16 corresponding to the content 12 identified in the session request and reviews the policy set forth therein (step 505). Presuming that such policy allows the transmitter 14x to provide the content 12 to the receiver 14r by way of the network 17, and also allows the action identified in the session request, the transmitter 14x composes and sends to the receiver 14r by way of the network 17 a session response (step 507) including the policy as obtained from and based on the license 16, the device ID 24 of the receiver 14r as obtained from the session request, the session ID-R from the receiver as obtained from the request, and the content key (KD) for decrypting the content 12 encrypted according to the public key of the receiver 14r (PU-R) as obtained from the certificate 22 sent with the session request. Alternatively, rather than sending (KD) encrypted by (PU-R), it may be the case that the transmitter 14x and receiver 14r both share knowledge of how to derive (KD) from a seed, whereby the seed is sent in the session response encrypted by (PU-R).

The content key (KD) for decrypting the content 12 if not derived from a seed may be obtained by the transmitter 14x from the corresponding license 16 as (PU-X(KD)), decrypted by the transmitter 14x by application of the corresponding (PR-X), and then re-encrypted according to (PU-R) to result in (PU-R(KD)); or such. Alternatively, the transmitter 14x may decide to obtain such (KD), decrypt the content 12 based thereon and re-encrypt according to another (KD), and then encrypt the another (KD) according to (PU-R) to result in (PU-R(KD)). Also alternatively, it may be that the content 12 is not initially encrypted at the transmitter 14x, in which case the transmitter selects a (KD), encrypts the content 12 according to such (KD), and then encrypts the selected (KD) according to (PU-R) to result in (PU-R(KD)). Likewise, the content key (KD) for decrypting the content 12 if in fact derived from a seed may be obtained by the transmitter 14x by obtaining the seed from the corresponding license 16 and deriving (KD) from the seed. If the content 12 is not initially encrypted at the transmitter 14x, the transmitter selects a seed, derives (KD) therefrom and encrypts the content 12 according to such (KD).

In one embodiment of the present invention, a signature or MAC is generated based on the session response and is appended thereto, where the signature/MAC binds the policy to the remainder of the session response and therefore can be employed to verify the session response. As may be appreciated, such binding is necessary so that the constituent parts of the session response cannot be accessed apart from each other, as a nefarious entity wishing to steal the content 13 may attempt to do. In one embodiment of the present invention, the signature/MAC is based on a symmetric integrity key (KI) selected for the session response, and thus the session response also includes therein the selected (KI) encrypted according to (PU-R) to result in (PU-R(KI)). Thus, only the receiver 14r with the corresponding (PR-R) can obtain (KI) from the session response and verify same, as will be seen below. Alternatively, and again, rather than sending (KI) encrypted by (PU-R), it may be the case that the transmitter 14x and receiver 14r both share knowledge of how to derive (KI) from a seed, whereby the seed is sent in the session response encrypted by (PU-R). Note that such seed may be the same seed from which (KD) was derived or may be a different seed.

In one embodiment of the present invention, the session response from the transmitter 14x to the receiver 14r also includes the version number of the revocation list 26 of the transmitter (V-RL-X). As was alluded to above, if the receiver 14r determines therefrom that (V-RL-R) is more current than (V-RL-X), the receiver 14r may send the revocation list 26 thereof to the transmitter 14x. Alternatively, it may be that the transmitter 14x has already determined by comparing the (V-RL-R) as received from the session request with (V-RL-X) that (V-RL-X) is more current than (V-RL-R), in which case the transmitter 14x may send the revocation list 26 thereof to the receiver 14r.

In one embodiment of the present invention, the session response from the transmitter 14x to the receiver 14r also includes a session ID-X generated by the transmitter 14x to identify the session to the receiver 14r, where such session ID-X differs from the session ID-R from the receiver 14r. As may be appreciated, the transmitter 14x may generate the session ID-X inasmuch as the session ID-R is not verifiable by a signature/MAC in the session request from the receiver 14r, may generate the session ID-X because the format of the session ID-R is not acceptable to the transmitter 14x, or may generate the session ID-R simply as a matter of good practice.

The transmitter 14x in conjunction with sending the session response as at step 507 also appropriately stores the session request or at least a portion thereof and the session response or at least a portion thereof in an appropriate session store 30x for later retrieval and use (step 509). In particular, and as seen below, the transmitter 14x stores in the session store 30x at least the identification of the content 12 and at least one of the session ID-X and the session ID-R.

At any rate, upon receiving the session response from the transmitter 14x, the receiver 14r retrieves (PU-R(KI)) and applies the corresponding (PR-R) thereto to result in the integrity key (KI), and then verifies the signature/MAC of the session response based on such (KI) (step 511). Alternatively, the receiver 14r retrieves the encrypted seed, applies the corresponding (PR-R) thereto to result in the seed, and derives the integrity key (KI) based on the seed, and then verifies the signature/MAC of the session response based on such (KI).

Presuming that such signature/MAC does indeed verify, the session between the transmitter 14x and the receiver 14r is then established, and the receiver 14r appropriately stores the session response from the transmitter 14x or at least a portion thereof in an appropriate session store 30r for later retrieval and use (step 513). Note here that although the session has been established with regard to the piece of content 12 identified in the session request from the receiver 14r as at step 501, the piece of content 12 has not as yet been delivered to the receiver 14r.

Thus, and referring now to FIG. 6, in one embodiment of the present invention, content 12 is transferred from the transmitter 14x to the receiver 14r by way of the network 17. In particular, and as seen, the receiver 14r retrieves the session response or part thereof as stored at step 513 from the session store 30r thereof and obtains from the retrieved session response the session ID-X as generated by the transmitter 14x (step 601). Alternatively, if a session ID-X as generated by the transmitter 14x is not set forth in the session response, the receiver 14r obtains therefrom the session ID-R as generated by the receiver 14r. Thereafter, the receiver 14r sends a transfer request to the transmitter 14x by way of the network 17 (step 603), where the transfer request includes the session ID-X or ID-R (hereinafter, 'ID'). The transmitter 14x upon receiving such transfer request identifies the session ID therein and retrieves the session request or part thereof and session response or part thereof as stored at step 509 from the session store 30x thereof based on the identified session ID (step 605). From such session response, the transmitter 14x retrieves the identification of the content 12 and then locates the package 13 containing such identified content 12 or else creates such package 13 (step 609). Note that such locating and/or creating may be performed above in connection composing the session response during step 507 of registration as shown in FIG. 5, especially if the transmitter 14x creates the package 13 with the content 12 therein encrypted according to (KD) to result in (KD(content)).

At any rate, the transmitter 14x sends a transfer response to the receiver 14r by way of the network 17 (step 611), where the transfer response includes the package 13 with the content 12 therein encrypted according to (KD) to result in (KD(content)). The receiver 14r upon receiving such transfer response may then retrieve the session response from the session store 30r thereof (step 613), retrieve the policy and (PU-R(KD)) or (PU-R(seed)) from the retrieved session response (step 615), confirm that the policy allows the receiver 14r to render the content 12 in the manner sought (step 617), and presuming such confirmation is gained may then apply (PR-R) to (PU-R(KD)) to reveal (KD) or else (PR-R) to (PU-R(seed)) to reveal the seed and then derive (KD) therefrom (step 619), apply (KD) to (KD(content)) to reveal the content 12 (step 621), and then in fact render the content 12 in accordance with the policy (step 623).

CONCLUSION

The present invention may be practiced with regard to any appropriate transmitter 14x and receiver 14r interconnected by a network 17, presuming that such transmitter 14x and receiver 14r have appropriate trusted components 18 thereon and the receiver 14r has a certificate 22 from a certifying authority approved by the transmitter 14x. As should now be appreciated, with the present invention as set forth herein, content 12 is delivered from a transmitter 14x to a receiver 14r by way of an interconnecting network 17 according to a method that is independent of the actual protocols used for transporting the content 12 by way of the network, and that is independent to the format of the content 12.

Note that although the present invention is disclosed primarily in terms of a receiver 14r that performs rendering such as playback or rasterizing among other things, the receiver 14r may perform other actions without departing from the spirit and scope of the present invention. Such other actions include but are not limited to transferring the content 12 to a separate computing device 14 such as a personal computer, a portable device, or the like; transferring the content 12 to a portable memory, a magnetic or optical disk, or the like; transferring the content 12 in a different protection scheme; exporting the content 12 without any protection scheme; transferring or exporting the content 12 in a different format; etc. In general, then, the transferred content 12 may be rendered, distributed, edited, employed for content creation, editing, and distribution, or the like. For example, content 12 could have policy that allows or forbids the content 12 to be edited in certain ways.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful architecture and method that allows content 12 with a corresponding license 16 tied to one computing device 14 in a network 17 or the like to be rendered by any other appropriate computing device 14 in the network 17, presuming the license 16 so allows. With the method, access to the content 12 is of negotiated as between the computing devices 14 in the network 17.

It should be appreciated that changes could be made to the embodiments described above without departing from the inventive concepts thereof. Perhaps most significantly, it is to be appreciated that although establishing a session (FIG. 5) and transferring content 12 (FIG. 6) are set forth essentially separately, such establishing and transferring may be performed essentially as a single procedure. As may be appreciated, in such a situation, several steps and items may be omitted if perceived as unnecessary. Other possible changes bearing mention include removal of various IDs such as session IDs and registration IDs. In general then, it should be understood, therefore, that this invention is not limited to the particular embodiments disclosed, but it is intended to cover modifications within the spirit and scope of the present invention as defined by the appended claims.

The invention claimed is:

1. A method in connection with a first computing device ('transmitter') and a second computing device ('receiver') interconnected by a network, the transmitter for transmitting protected digital content to the receiver in a manner so that the receiver can access the protected digital content, the method comprising:

the transmitter receiving the protected digital content in encrypted form as originally provided by a content provider separate from the transmitter, the protected digital content received by the transmitter being encrypted and decryptable according to a content key (KD) to result in (KD(content));

the receiver registering with the transmitter for providing an indication to the transmitter that the receiver is a trusted component of the transmitter, the receiver registering with the transmitter by sending a registration request to the transmitter, the registration request including a unique identification of the receiver;

the transmitter validating the registration request;

the receiver sending a session request to the transmitter, the session request including an identification of the protected digital content to the transmitter, an action to be taken with the protected digital content, and the unique identification of the receiver;

the transmitter receiving the session request from the receiver, determining from the unique identification of the receiver in the session request that the receiver is in fact registered to the transmitter, obtaining a digital license corresponding to the identified protected digital content in the session request, reviewing a policy set forth in the license to determine that the license allows the transmitter to provide access to the protected digital content to the receiver and also allows the action in the session request, and sending a session response to the receiver, the session response including the policy from the license, the unique identification of the receiver, and the content key (KD) for decrypting the protected digital content, the content key (KD) in the session response being protected in a form obtainable by the receiver, the receiver not receiving any license corresponding to the identified protected digital content from the content provider of the identified protected digital content in response to the session request;

the transmitter sending (KD(content)) to the receiver;

the receiver receiving the session response and (KD(content)) from the transmitter and not the content provider, retrieving the policy and the protected content key (KD) for decrypting the protected digital content from the session response, confirming that the policy allows the receiver to render the protected digital content, obtaining the content key (KD) from the protected form thereof in the session response, applying (KD) to (KD(content)) to reveal decrypted content obtained from the protected digital content, and then in fact rendering the decrypted content in accordance with the policy.

2. The method of claim 1 comprising:

the transmitter in conjunction with sending the session response also storing at least a portion of the session request and at least a portion of the session response in a transmitter session store;

the receiver receiving the session response from the transmitter and storing at least a portion of the session response in a receiver session store;

the receiver retrieving at least a portion of the session response from the receiver session store, and sending a transfer request to the transmitter based on the session response; and the transmitter receiving the transfer request and retrieving the at least a portion of the session request and at least a portion of the session response from the transmitter store based on the transfer request, retrieving from the retrieved at least a portion of the session request and at least a portion of the session response the identification of the protected digital content, obtaining the protected digital content encrypted according to (KD) to result in (KD(content)), and sending a transfer response to the receiver including (KD(content)).

3. The method of claim 1 comprising the receiver sending the session request further including a version number of a revocation list of the receiver (V-RL-R), and the transmitter sending the session response further including a version number of a revocation list of the transmitter (V-RL-X), the method further comprising the receiver determining that (V-RL-R) is more current than (V-RL-X) and sending the revocation list thereof to the transmitter.

4. The method of claim 1 comprising the receiver sending the session request further including a version number of a revocation list of the receiver (V-RL-R), and the transmitter determining that a version number of a revocation list thereof (V-RL-X) is more current than (V-RL-R) and sending the revocation list thereof to the receiver.

5. The method of claim 1 comprising the receiver sending a session request to the transmitter including a public key of the receiver (PU-R) and the transmitter sending a session response to the receiver including the content key (KD) for decrypting the protected digital content, wherein the content key (KD) is encrypted according to (PU-R).

6. The method of claim 1 comprising the receiver sending a session request to the transmitter including a public key of the receiver (PU-R) and the transmitter sending a session response to the receiver including a seed from which the content key (KD) for decrypting the protected digital content may be derived, the seed being encrypted according to (PU-R).

7. The method of claim 1 wherein the transmitter has a public-private key pair (PU-X, PR-X), and further comprising the transmitter obtaining the protected content key (KD) from the license as (PU-X(KD)), applying (PR-X) to (PU-X(KD)) to result in (KD), and then re-encrypting (KD) according to a public key of the receiver (PU-R) to result in (PU-R(KD)), the receiver decrypting the protected content key by applying a private key (PR-R) corresponding to (PU-R) to (PU-R(KD)) to result in (KD).

8. The method of claim 1 comprising the transmitter sending a session response to the receiver further including a signature/Media Access Control Address (MAC) generated based on such session response, the signature/MAC binding the policy to the session response.

9. The method of claim 8 comprising the transmitter sending a session response to the receiver including a signature/MAC based on a symmetric integrity key (KI), the session response further including (KI) encrypted according to a public key of the receiver (PU-R) to result in (PU-R(KI)), the method also comprising the receiver receiving the session response from the transmitter, retrieving (PU-R(KI)) therefrom, applying a private key (PR-R) corresponding to (PU-R) to (PU-R(KI)) to result in the (KI), and verifying the signature/MAC of the session response based on (KI).

10. The method of claim 8 comprising the transmitter sending a session response to the receiver including a signature/MAC based on a symmetric integrity key (KI) derivable from a seed, the session response further including the seed protected according to a public key of the receiver (PU-R) to result in (PU-R(seed)), the method also comprising the receiver receiving the session response from the transmitter, retrieving (PU-R(seed)) therefrom, applying a private key (PR-R) corresponding to (PU-R) to (PU-R(seed)) to result in the seed, deriving (KI) from the seed, and verifying the signature/MAC of the session response based on (KI).

11. The method of claim 1 further comprising:

responsive to the registration request, the transmitter sending a registration response to the receiver, the registration response including a registration identification (ID) generated by the transmitter to identify the registration response, and the unique identification of the receiver, thereby forming a first nonce;

the receiver sending a port address of a port thereof and the registration ID to the transmitter;

the transmitter sending a proximity message to the receiver by way of the sent port address and concurrently noting a start time, thereby forming a second nonce;

the receiver upon receiving the proximity message at the port address thereof employing at least a portion of the registration response and the proximity message to generate a proximity value and sending a proximity response with the proximity value to the transmitter; and the transmitter receiving the proximity response with the proximity value from the receiver and concurrently noting an end time, verifying the proximity value based on the first and second nonces, calculating from the noted start and end times an elapsed time, comparing the elapsed time to a predetermined threshold value, deciding from the comparison that the receiver satisfies a proximity requirement, and registering the receiver as being able to access protected digital content from such transmitter.

12. The method of claim 11 comprising the receiver sending a registration request to the transmitter including a digital certificate provided to the receiver by an appropriate certifying authority, the certificate including therein a public key of the receiver (PU-R) and a digital signature, the method also comprising the transmitter validating the certificate and verifying with reference to a revocation list that the certificate has not been revoked.

13. The method of claim 11 comprising the receiver sending a registration request to the transmitter including a device identification (ID) of the receiver.

14. The method of claim 11 comprising the receiver sending a registration request to the transmitter including a public key of the receiver (PU-R), and comprising the transmitter encrypting at least a portion of the registration response by (PU-R) and the receiver decrypting the registration response by application of a private key (PR-R) corresponding to (PU-R).

15. The method of claim 11 comprising:

the transmitter sending the registration response including a first nonce to the receiver;

the transmitter sending the proximity message with a second nonce to the receiver by way of the sent port address and concurrently noting the start time;

the receiver upon receiving the proximity message at the port address thereof employing the sent first and second nonces to generate the proximity value and sending the proximity response with the proximity value and the registration ID to the transmitter.

16. The method of claim 15 comprising the receiver generating a proximity value by employing the first nonce as a cryptographic key to perform an encryption of the second nonce and thus result in an encrypted value.

17. The method of claim 15 comprising the receiver generating a proximity value by employing the first nonce as a cryptographic key to perform a hash over the second nonce and thus result in a hash value.

18. The method of claim 15 comprising the receiver generating a proximity value by performing a hash over the first and second nonces to result in a hash value.

19. The method of claim 11 comprising the transmitter registering the receiver by placing the unique identification of the receiver in a registry list, and determining from the unique identification of the receiver in the session request with reference to the registry list that the receiver is in fact registered to the transmitter.

20. The method of claim 11 comprising the transmitter periodically requiring the receiver to re-register by re-sending a registration request to the transmitter.

* * * * *

UNITED STATES PATENT AND TRADEMARK OFFICE
CERTIFICATE OF CORRECTION

PATENT NO. : 7,437,771 B2  
APPLICATION NO. : 10/827167  
DATED : October 14, 2008  
INVENTOR(S) : James M. Alcove et al.

Page 1 of 1

It is certified that error appears in the above-identified patent and that said Letters Patent is hereby corrected as shown below:

Title Page

At (73) Assignee, delete "Woodcock Washburn LLP" and insert --Microsoft Corporation-- therefor.

Signed and Sealed this  
Twenty-eighth Day of May, 2013

Teresa Stanek Rea  
*Acting Director of the United States Patent and Trademark Office*